(12) United States Patent
Beppu et al.

(10) Patent No.: US 8,080,604 B2
(45) Date of Patent: Dec. 20, 2011

(54) ADHESIVE CONTAINING LADDER-TYPE POLYSILSESQUIOXANE AND ADHESIVE SHEET

(75) Inventors: Shiori Beppu, Tokyo (JP); Mikihiro Kashio, Tokyo (JP); Toshio Sugizaki, Tokyo (JP); Toshifumi Kageyama, Yokohama (JP); Osamu Moriya, Yokosuka (JP)

(73) Assignee: Lintec Corporation, Tokyo (JP)

( * ) Notice: Subject to any disclaimer, the term of this patent is extended or adjusted under 35 U.S.C. 154(b) by 172 days.

(21) Appl. No.: 12/073,058

(22) Filed: Feb. 28, 2008

(65) Prior Publication Data

US 2008/0249271 A1 Oct. 9, 2008

(30) Foreign Application Priority Data

Mar. 2, 2007 (JP) ................................ 2007-052993

(51) Int. Cl.
*C09J 183/04* (2006.01)
*C08G 77/12* (2006.01)

(52) U.S. Cl. .......... 524/413; 526/273; 526/279; 528/31

(58) Field of Classification Search .................. 524/413; 526/273, 279; 528/31
See application file for complete search history.

(56) References Cited

U.S. PATENT DOCUMENTS

| | | | | |
|---|---|---|---|---|
| 4,626,556 A | * | 12/1986 | Nozue et al. | 522/99 |
| 4,980,096 A | * | 12/1990 | Eian et al. | 554/111 |
| 2005/0009982 A1 | * | 1/2005 | Inagaki et al. | 524/588 |
| 2008/0051487 A1 | * | 2/2008 | Kumon et al. | 522/146 |

FOREIGN PATENT DOCUMENTS

| | | | |
|---|---|---|---|
| JP | 58-59222 A | | 4/1983 |
| JP | 6-306173 A | | 11/1994 |
| JP | 7-70321 A | | 3/1995 |
| JP | 08-092374 | * | 4/1996 |
| JP | 8-92374 A | | 4/1996 |
| JP | 10-87834 A | | 4/1998 |
| JP | 2003-49079 A | | 2/2003 |

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

An adhesive containing a ladder-type polysilsesquioxane which firmly bonds metals and synthetic resins and an adhesive sheet having an adhesive layer formed by using the adhesive on at least one side of a substrate are provided. An adhesive comprises a ladder-type polysilsesquioxane having a recurring unit of the following formula (I) in the molecule,

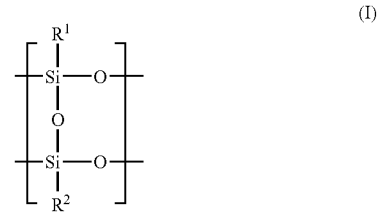

(I)

wherein $R^1$ represents a polymerizable functional group, and $R^2$ represents the same group as $R^1$, an alkyl group having 1 to 6 carbon atoms which may have a substituent, an alkoxy group having 1 to 6 carbon atoms which may have a substituent, or a phenyl group which may have a substituent, and the adhesive sheet has an adhesive layer formed by using the adhesive on at least one side of the substrate.

7 Claims, No Drawings

ADHESIVE CONTAINING LADDER-TYPE POLYSILSESQUIOXANE AND ADHESIVE SHEET

BACKGROUND OF THE INVENTION

1. Field of the Invention

The present invention relates to an adhesive containing a ladder-type polysilsesquioxane which firmly bonds metals and synthetic resins, and to an adhesive sheet having an adhesive layer formed by using the adhesive.

2. Description of Related Art

A printed circuit board with a circuit formed on the surface of an insulating substrate is widely used for electronic devices and semiconductor devices. In recent years, development of a printed circuit board with an increased circuit density and a reduced thickness is desired following the demand of miniaturizing electronic equipment and increasing functions.

A semiadditive method is known as a method of preparing a highly minute printed circuit board which realizes such a detailed circuit. This method comprises applying electroless copper plating on the surface of an insulated substrate made of a polymer and etch-removing the thin copper layer formed by electroless plating to form a circuit pattern. It is possible to form a minute circuit pattern with sufficient accuracy by this method.

However, a thin copper layer produced between an insulated substrate and a circuit pattern by electroless plating according to the semi-additive method substantially does not possess adhesiveness to an insulated substrate. Therefore, although the adhesion between the circuit pattern and the insulated substrate can be excellently maintained due to the anchor effect of the thin copper layer when an insulating substrate with a surface having a comparatively large roughness is used, adhesiveness is not sufficient enough when using an insulated substrate with a smooth surface. In such a case, the adhesion of a formed circuit pattern is insufficient.

For this reason, the surface of the insulating substrate is roughened in order to increase the adhesive strength of a circuit (Patent Document 1, etc.).

Such roughness of the surface of an insulating substrate is not likely to cause a problem when the value of the line-and-space of the formed circuit pattern is large, but may affect a high-density circuit with extra-fine lines to be used for forming a more minute circuit pattern.

As mentioned above, since an increased circuit density and a reduced thickness has been desired for printed circuit boards in recent years, a circuit-forming technique in which adhesiveness is not impaired when an insulating substrate with a smooth surface is used is strongly desired.

In relation to the present invention, a polysilsesquioxane having a ladder-type structure is known as a polymer which forms a thin film with excellent hardness, heat resistance, weather resistance, and the like (Patent Documents 2 to 5).

Patent Document 6 discloses that a resin composition containing a polyorganosilsesquioxane having a hydroxyl group, an acrylics copolymer resin having an alcoholic hydroxyl group, and a polyisocyanate compound exhibits excellent adhesion to a metal, particularly to aluminum.

However, the Patent Documents 2 to 6 do not disclose that the polysilsesquioxane having a ladder structure is used as an adhesive which firmly bonds a metal and a synthetic resin.

[Patent Document 1] Japanese Patent Application Laid-open No. 2003-49079
[Patent Document 2] Japanese Patent Application Laid-open No. 58-59222
[Patent Document 3] Japanese Patent Application Laid-open No. 7-70321
[Patent Document 4] Japanese Patent Application Laid-open No. 8-92374
[Patent Document 5] Japanese Patent Application Laid-open No. 6-306173
[Patent Document 6] Japanese Patent Application Laid-open No. 10-87834

An object of the present invention is to provide an adhesive containing a ladder-type polysilsesquioxane which firmly bonds metals and synthetic resins, and to an adhesive sheet having an adhesive layer formed by using the adhesive.

As a result of extensive studies, the inventors of the present invention have synthesized a ladder-type polysilsesquioxane by condensing polymerization of an alkoxysilane compound which has a polymerizable functional group at the molecule terminals such as 3-glycidoxypropyltrimethoxysilane. The inventors have found that a composition prepared by adding a curing agent such as 2-ethyl-4-methylimidazole to the ladder-type polysilsesquioxane can be used as an adhesive which firmly bonds metals and synthetic resins. This finding has led to the completion of the present invention.

SUMMARY OF THE INVENTION

Specifically, according to a first invention of the present invention, the following adhesives (1) to (6) are provided.

(1) An adhesive comprising a ladder-type polysilsesquioxane having a recurring unit of the following formula (I) in the molecule,

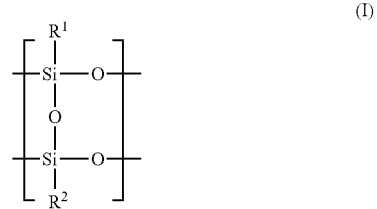

wherein $R^1$ represents a polymerizable functional group, and $R^2$ represents the same group as $R^1$, an alkyl group having 1 to 6 carbon atoms which may have a substituent, an alkoxy group having 1 to 6 carbon atoms which may have a substituent, or a phenyl group which may have a substituent.

(2) The adhesive according to (1), wherein the polymerizable functional group of $R^1$ is an epoxy group, a glycidyloxy group, a (meth)acryloyl group, a (meth)acryloyloxy group, or a vinyl group.

(3) The adhesive according to (1) or (2), wherein $R^2$ is an alkyl group having 1 to 6 carbon atoms, an alkoxy group having 1 to 6 carbon atoms, or a phenyl group which may have at least one substituent selected from the group consisting of an epoxy group, a glycidyloxy group, a (meth)acryloyl group, a (meth)acryloyloxy group, a vinyl group, a cyano group, a mercapto group, an oxo group (=O), an acetoacetoxy group [$CH_3C(=O)CH_2C(=O)O-$], and an amino group which may have a substituent.

(4) The adhesive according to any one of (1) to (3), wherein $R^1$ is a polymerizable functional group having an alkylene group having 1 to 6 carbon atoms which may have a substituent or a phenylene group which may have a substituent bonded thereto.

(5) The adhesive according to any one of (1) to (4), wherein the material to be bonded is at least one material selected from the group consisting of glass, ceramics, a metal, and a synthetic resin.

(6) The adhesive according (5), wherein the metal is copper, aluminum, gold, platinum, or an alloy of these metals.

According to a second aspect of the present invention, an adhesive sheet described in (7) below is provided.

(7) An adhesive sheet having an adhesive layer formed by using the adhesive according to any one of (1) to (4) on at least one side of a substrate.

The adhesive of the present invention can firmly bond metals and synthetic resins.

In addition, the adhesive sheet having an adhesive layer formed using the adhesive of the present invention has excellent bonding strength to various materials.

According to the present invention, a conductive circuit of a metal formed on a smooth surface of an insulating substrate exhibits sufficient adhesion strength to the substrate.

DETAILED DESCRIPTION OF THE INVENTION AND PREFERRED EMBODIMENTS

The present invention will be described in detail below.

1) Adhesive

The adhesive of the present invention is characterized by comprising a ladder-type polysilsesquioxane having a recurring unit of the above formula (I) in the molecule.

In the above formula (I), $R^1$ represents a polymerizable functional group.

The polymerizable functional group is a group inducing a photopolymerization reaction, a thermal polymerization reaction, a radical polymerization reaction, and a cross-linking reaction.

As specific examples of the polymerizable functional group, an epoxy group, a glycidyloxy group, a (meth)acryloyl group, a (meth)acryloyloxy group, a vinyl group, and the like can be given.

Among these, in order to provide an adhesive with a superior adhesion strength, the polymerizable functional group such as an epoxy group, a glycidyloxy group, a (meth)acryloyl group, a (meth)acryloyloxy group, or a vinyl group bonded to the following linking group is particularly preferable as $R^1$.

The linking group is a group which connects the silicon atom in the polysilsesquioxane molecule with the polymerizable functional group.

As specific examples of the linking group, an alkylene group having 1 to 6 carbon atoms which may have a substituent, a phenylene group which may have a substituent, and a combination of such an alkylene group and phenylene group can be given.

As specific examples of the alkylene group in the alkylene group having 1 to 6 carbon atoms which may have a substituent, a methylene group, an ethylene group, a propylene group, a trimethylene group, and a tetramethylene group can be given.

As examples of the substituent for the alkylene group having 1 to 6 carbon atoms, a halogen atom such as a fluorine atom, a chlorine atom, or a bromine atom; an alkoxy group having 1 to 6 carbon atoms such as a methoxy group or an ethoxy group; and the like can be given.

As examples of the phenylene group which may have a substituent, an o-phenylene group, a p-phenylene group, an m-phenylene group, and the like can be given.

As examples of the substituent for the phenylene group, a nitro group; a cyano group; a halogen atom such as a fluorine atom, a chlorine atom, or a bromine atom; an alkoxy group having 1 to 6 carbon atoms such as a methoxy group or an ethoxy group; an alkyl group having 1 to 6 carbon atoms such as a methyl group or an ethyl group; and the like can be given.

The linking group may link via an oxygen atom, in addition to the above-mentioned alkylene group having 1 to 6 carbon atoms which may have a substituent, a phenylene group which may have a substituent, or a combination of these.

Of these, a 3-glycidyloxypropyl group or a 3-(meth)acryloyloxypropyl group is preferable as $R^1$ in the present invention.

$R^2$ represents the same group as $R^1$, an alkyl group having 1 to 6 carbon atoms which may have a substituent, an alkoxy group having 1 to 6 carbon atoms which may have a substituent, or a phenyl group which may have a substituent.

As examples of the alkyl groups in the alkyl group having 1 to 6 carbon atoms which may have a substituent represented by $R^2$, a methyl group, an ethyl group, an n-propyl group, an isopropyl group, an n-butyl group, a sec-butyl group, a t-butyl group, an n-pentyl group, and an n-hexyl group can be given.

As examples of the alkoxy groups in the alkoxy group having 1 to 6 carbon atoms which may have a substituent represented by $R^2$, a methoxy group, an ethoxy group, a propoxy group, a butoxy group, and a pentyloxy group can be given.

As examples of the substituents for the alkyl group having 1 to 6 carbon atoms or the alkoxy group having 1 to 6 carbon atoms represented by $R^2$, an epoxy group, a glycidyloxy group, a (meth)acryloyl group, a (meth)acryloyloxy group, a vinyl group, a cyano group, a mercapto group, an oxo group, an acetoacetoxy group, and an amino group which may have a substituent can be given.

As examples of the substituent for the phenyl group, a nitro group; a cyano group; a halogen atom such as a fluorine atom, a chlorine atom, or a bromine atom; an alkoxy group having 1 to 6 carbon atoms such as a methoxy group or an ethoxy group; an alkyl group having 1 to 6 carbon atoms such as a methyl group or an ethyl group; and the like can be given.

The alkyl group having 1 to 6 carbon atoms, alkoxy group having 1 to 6 carbon atoms, and phenyl group represented by $R^2$ may have one or more substituents in any arbitrary position, the substituents being either the same or different.

Of these, $R^2$ is preferably the group shown by $R^1$, a phenyl group, a 2-cyanoethyl group, a 3-mercaptopropyl group, a 3-(acetoacetoxy)propyl group, an acetoacetoxy group, or a 3-(N,N-dimethylamino)propyl group.

The polysilsesquioxane compound (I) can be produced as follows, for example. Specifically, the polysilsesquioxane compound (I) can be prepared by condensing a silane compound of the formula $(R^1)Si(OR^4)_p(X^1)_{3-p}$ (hereafter "silane compound (1)") and a silane compound of the formula $R^2Si(OR^5)_q(X^2)_{3-q}$ (hereafter "silane compound (2)"), in an amount of 0 to 100 times parts by mass for one part by mass of the amount of the silane compound (1), in the presence of an acid catalyst or a base catalyst.

In the formulas (1) and (2), $R^1$ and $R^2$ have the same meanings as defined above.

$R^4$ and $R^5$ individually represent an alkyl group having 1 to 6 carbon atoms such as a methyl group, an ethyl group, an n-propyl group, an isopropyl group, or an n-butyl group, with the methyl group or ethyl group being preferable.

$X^1$ and $X^2$ individually represent a halogen atom such as a chlorine atom and a bromine atom, with the chlorine atom being preferable.

p and q are integers from 0 to 3.

As specific examples of the silane compound (1), an alkoxysilane compound having an epoxy group such as γ-glycidoxypropyltrimethoxysilane, γ-glycidoxypropyltriethoxysilane, γ-glycidylpropyltrimethoxysilane, and γ-glycidylpropyltriethoxysilane;

an alkoxysilane compound having an acryloxy group such as acryloxymethyltrimethoxysilane, acryloxymethyltriethoxysilane, 2-acryloxyethyltrimethoxysilane, 2-acryloxyethyltriethoxysilane, 3-acryloxypropyltrimethoxysilane, 3-acryloxypropyltriethoxysilane, 4-acryloxybutyltrimethoxysilane, and 4-acryloxybutyltriethoxysilane;
an alkoxysilane compound having a methacryloxy group such as methacryloxymethyltrimethoxysilane, methacryloxymethyltriethoxysilane, methacryloxymethyltripropoxysilane, 2-methacryloxyethyltrimethoxysilane, 2-methacryloxyethyltriethoxysilane, 2-methacryloxyethyltripropoxysilane, 3-methacryloxypropyltrimethoxysilane, 3-methacryloxypropyltriethoxysilane, 3-methacryloxypropyltripropoxysilane, 4-methacryloxybutyltrimethoxysilane, 4-methacryloxybutyltriethoxysilane, and 4-methacryloxybutyltropropoxysilane;
an alkoxysilane compound having a vinyl group such as vinyltrimethoxysilane and vinyltriethoxysilane; and the like can be given.

These silane compounds (1) may be used either individually or in combination of two or more.

Specific examples of the silane compound (2) include:
an alkoxysilane compound having ant alkyl group such as methyltrimethoxysilane, methyltriethoxysilane, ethyltrimethoxysilane, ethyltriethoxysilane, n-propyltrimethoxysilane, and n-propyltriethoxysilane;
an alkoxysilane compound having a cyano group such as cyanomethyltrimethoxysilane, cyanomethyltriethoxysilane, 2-cyanoethyltrimethoxysilane, 2-cyanoethyltriethoxysilane, 3-cyanopropyltrimethoxysilane, 3-cyanopropyltriethoxysilane, 4-cyanobutyltrimethoxysilane, and 4-cyanobutyltriethoxysilane;
an alkoxysilane compound having a mercapto group such as γ-mercaptopropyltrimethoxysilane, γ-mercaptopropyltriethoxysilane, β-mercaptopropyltrimethoxysilane, and β-mercaptopropyltriethoxysilane;
an alkoxysilane compound having an amino group such as 3-aminopropyltrimethoxysilane, 3-aminopropyltriethoxysilane, γ-(2-aminoethyl)aminopropyltrimethoxysilane, aminosilane, N-(2-aminoethyl)-3-aminopropyltrimethoxysilane, N-phenyl-3-aminopropyltrimethoxysilane, and N-2-(aminoethyl)-3-aminopropyltrimethoxysilane;
an alkoxysilane compound having a dimethylamino group such as 3-(N,N-dimethylamino)propyltrimethoxysilane and 3-(N,N-dimethylamino)propyltriethoxysilane;
an alkoxysilane compound having an acetoacetoxy group [$CH_3C(=O)CH_2C(=O)O-$] such as acetoacetoxytrimethoxysilane, acetoacetoxytriethoxysilane, 3-acetoacetoxypropyltrimethoxysilane, and 3-acetoacetoxypropyltriethoxysilane;
an alkoxysilane compound having an acetoxy group such as acetoxymethyltrimethoxysilane, acetoxymethyltriethoxysilane, 3-acetoxypropyltrimethoxysilane, and 3-acetoxypropyltriethoxysilane; and the like.

These silane compounds (2) may be used either individually or in combination of two or more.

The mixing ratio of the silane compound (1) and the silane compound (2) may be arbitrarily set, usually in a range of the silane compound (1):the silane compound (2)=100:0 to 1:99 by parts by mass.

As examples of the solvent used for the reaction in preparing the polysilsesquioxane compound (I), aromatic hydrocarbons such as benzene, toluene, and xylene; esters such as methyl acetate, ethyl acetate, propyl acetate, and methyl propionate; ketones such as acetone, methyl ethyl ketone, methyl isobutyl ketone, and cyclohexanone; alcohols such as methyl alcohol, ethyl alcohol, n-propyl alcohol, isopropyl alcohol, n-butyl alcohol, isobutyl alcohol, sec-butyl alcohol, and t-butyl alcohol; water; and the like can be given.

These solvents may be used either individually or in combination of two or more.

As examples of the acid catalyst, an inorganic acid such as hydrochloric acid and sulfuric acid; and an organic acid such as p-toluenesulfonic acid, p-toluenesulfonic acid monohydrate, sulfonic acid, methanesulfonic acid, ethanesulfonic acid, acetic acid, and formic acid can be given.

As examples of the base catalyst, a metal hydroxide such as sodium hydroxide, potassium hydroxide, magnesium hydroxide, and calcium hydroxide; metal alkoxides such as sodium methoxide, sodium ethoxide, potassium methoxide, potassium t-butoxide, magnesium methoxide, and magnesium ethoxide; primary amines such as methylamine, ethylamine, and butylamine; secondary amines such as diethylamine and dibutylamine; tertiary amines such as triethylamine and diisopropylethylamine; nitrogen-containing heterocyclic compounds such as pyridine and 1,8-diazabicyclo[5.4.0]undec-7-ene (DBU); and the like can be given.

The acid catalyst or the base catalyst is used in an amount of usually 0.001 to 25 parts by mass, and preferably 0.01 to 20 parts by mass per 100 parts by mass of the silane compound (1).

The reaction temperature is usually in the range from 0° C. to the boiling point of the solvent used, and preferably in the range of 40° C. to 130° C. If the temperature is too low, the condensation reaction proceeds only insufficiently. On the other hand, if the temperature is too high, inhibition of gel production is difficult. The reaction is usually completed within several minutes to several hours.

The recurring unit of the (co)condensation product obtained from the silane compound (1) and/or the silane compound (2) is shown by any of the following formulas (i) to (iii).

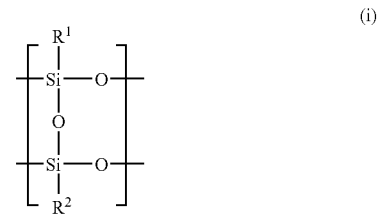

(i)

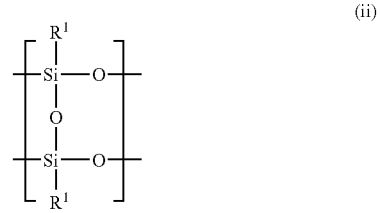

(ii)

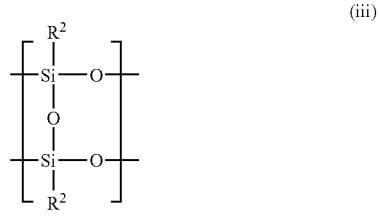

(iii)

wherein $R^1$ and $R^2$ have the same meanings as defined above.

The polysilsesquioxane compound (I) is not particularly limited insofar as the polysilsesquioxane compound (I)

includes at least the recurring unit (i) and/or the recurring unit (ii) in the molecule. When the polysilsesquioxane compound (I) used in the present invention is a copolymer having the recurring units (i) and (ii), the recurring unit (i) and (iii), the recurring units (ii) and (iii), or the recurring units (i), (ii) and (iii), the copolymer may be any copolycondensation product such as a random copolymer, a partial block copolymer, or a complete block copolymer. In addition, the polysilsesquioxane compound (I) may be a mixture of any one of the above (co)polymers and a (co)polymer having any one of the recurring unit (i), the recurring unit (ii), and the recurring unit (iii).

The recurring unit (i) may be a recurring unit (iv) shown below or the like.

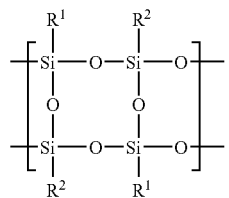

The polysilsesquioxane compound (I) having a linear recurring unit structure called a ladder structure can be obtained in this manner. Whether or not the reaction product has a ladder structure may be confirmed by measuring the infrared absorption spectrum or X-ray diffraction of the reaction product, for example.

The number average molecular weight (Mn) of the polysilsesquioxane compound (I) is usually 500 to 30,000, and preferably 1,000 to 20,000. The number average molecular weight may be measured by size exclusion chromatography (SEC) as a polystyrene-reduced number average molecular weight, for example.

The molecular weight distribution (Mw/Mn) of the polysilsesquioxane compound (I) is not particularly limited. The molecular weight distribution is usually 1.0 to 3.0, and preferably 1.1 to 2.0.

An adhesive according to the present invention contains one or more polysilsesquioxane compounds (I).

The adhesive according to the present invention may contain a curing agent in addition to the polysilsesquioxane compound (I).

The curing agent may be either a heat-curing agent or a photo-initiator. In the present invention, different curing agents may be used according to the types of polymerizable functional group of the polysilsesquioxane compounds (I).

For example, when the polysilsesquioxane compound (I) has an epoxy group or a glycidyloxy group, a heat-curing agent such as an imidazole such as imidazole, 2-methylimidazole, 2-ethyl-4-methylimidazole, 2-mercaptomethylbenzimidazole, 2-ethylimidazole-4-dithiocarboxylic acid, 2-methylimidazole-4-carboxylic acid, 1-(2-aminoethyl)-2-methylimidazole, 1-(2-cyanoethyl)-2-methylimidazole, 2-phenyl-4,5-dihydroxymethylimidazole, benzimidazole, and 2-ethyl-4-thiocarbamoylimidazole; a pyrazole such as pyrazole and 3-amino-4-cyanopyrazole; triazoles such as 1,2,4-triazole, 2-amino-1,2,4-triazole, 1,2-diamino-1,2,4-triazole, and 1-mercapto-1,2,4-triazole; 2-aminotriazine, 2,4-diamino-6-(6-(2-(2methyl-1-imidazolyl)ethyl)triazine, 2,4,6-trimercapto-s-triazine trisodium salt); and the like can be preferably used. The adhesive containing the polysilsesquioxane compound (I) can be cured with heat by using these heat-curing agents.

When the polysilsesquioxane compound (I) has a (meth) acryloyl group, a (meth)acryloyloxy group, or a vinyl group, a photo-initiator such as a benzyl methyl ketal compound such as 2,2-dimethoxy-1,2-diphenylethan-1-one; an α-hydroxyketone compound such as 1-hydroxycyclohexyl phenyl ketone, 2-hydroxy-2-methyl-1-phenylpropan-1-one, and 1-[4-(2-hydroxyethoxy)phenyl]-2-hydroxy-2-methyl-1-propan-1-one; an α-aminoketone compound such as 2-methyl-1-[4-(methylthio)phenyl]-2-morpholinopropan-1-one, 2-benzyl-2-dimethylamino-1-(4-morpholinophenyl)-butanone-1; a bisacylphosphine oxide compound such as bis(2,4,6-trimethylbenzoyl)phenylphosphine oxide; a metallocene compound such as bis(η-5-2,4-cyclopentadien-1-yl)-bis(2,6-difluoro-3-(1H-pyrrol-1-yl)-phenyl)titanium; a thioxanethone compound such as 2,4-diethylthioxanthone, isopropylthioxanthone, 1-chloro-4-propoxythioxanethone, and 2-(3-dimethylamino-2-hydroxypropoxy)-3,4-dimethyl-9H-thioxanethon-9-one mesochloride; and the like can be preferably used. The adhesive containing the polysilsesquioxane compound (I) can be cured with light by using these photo-initiators.

The amount of the curing agents to be added is 0.1 to 10 parts by mass, preferably 0.5 to 5 parts by mass per 100 parts by mass of the polysilsesquioxane compound (I).

When the polysilsesquioxane compound (I) has a polymerizable functional group (an epoxy group, a glycidyloxy group, etc.) and a group Slaving a curing function to the polymerizable functional group (an amino group, an alkylamino group, a dialkylamino group, a mercapto group, etc.) in the molecule, the polysilsesquioxane compound (I) can be cured without adding a curing agent.

The adhesive according to the present invention may be produced by dissolving a prescribed amount of the polysilsesquioxane compound (I), and optionally a curing agent, in an appropriate solvent.

The solvent used is not particularly limited insofar as the polysilsesquioxane compound (I) and the curing agent can be dissolved therein. As examples of the solvent, an aromatic hydrocarbon such as benzene, toluene, and xylene; an ester such as methyl acetate, ethyl acetate, propyl acetate, and methyl propionate; a ketone such as acetone, methyl ethyl ketone, methyl isobutyl ketone, and cyclohexanone; an alcohol such as methyl alcohol, ethyl alcohol, n-propyl alcohol, isopropyl alcohol, n-butyl alcohol, isobutyl alcohol, sec-butyl alcohol, and t-butyl alcohol; water; and the like can be given.

These solvents may be used either individually or in combination of two or more.

Although not particularly limited, an insulating material is preferable as a material to be bonded by the adhesive of the present invention. For example, a glass such as a soda lime glass and Pyrex (registered trademark) glass; ceramics; a metal such as copper, aluminum, gold, platinum, and an alloy of these metals; a synthetic resin such as a polyester such as polyethyleneterephthalate, polybuthyleneterephthalate, and polyethylenenaphthalate, polyethylene, polypropylene, polyvinyl chloride, polyvinylidene chloride, polyvinyl alcohol, ethylene-vinyl acetate copolymer, polystyrene, polycarbonate, polymethylpentene, polysulfone, polyether ether ketone, polyether sulfone, polyphenylene sulfide, polyether imide, polyimide, fluororesin, polyamide, acrylic resin, norbornene resin, cycloolefin resin, and class epoxy resin; and the like can be given.

The materials to be bonded, particularly a metal layer and an insulating layer which do not have adhesive properties, can be firmly bonded by using the adhesive according to the present invention.

Specifically, the materials to be bonded can be firmly bonded by applying and drying the adhesive of the present invention on the materials and curing the adhesive. The adhesive can be cured by heating at a specified temperature (100 to 200° C.) under pressure, if necessary, when the adhesive is heat curable, or by irradiating with UV rays (at a dose of 100 to 1,000 mJ/cm$^2$) when the adhesive is photo curable.

2) Adhesive Sheet

The adhesive sheet of the present invention has an adhesive layer formed using the adhesive of the present invention on at least one side of a substrate.

More specifically, the adhesive sheet of the present invention is prepared by forming a layer of the adhesive by applying the adhesive of the present invention on one side or both sides of a substrate such as a metal foil or a synthetic resin, and drying the coated layer of the adhesive. If desired, a protective sheet is bonded to the surface of the adhesive layer to obtain an adhesive sheet suitable for transportation and preservation.

As examples of the substrate of the adhesive sheet, a metal foil such as copper, aluminum, gold, platinum, and an alloy of these metals; a polyester film such as a polyethyleneterephthalate film, a polybuthyleneterephthalate film, and a polyethylenenaphthalate film; a synthetic resin film such as a polyethylene film, a polypropylene film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyphenylene sulfide film, a polyether imide film, a polyimide film, a fluororesin film, a polyamide film, an acrylic resin film, a norbornene resin film, and a cycloolefin resin film; and the like can be given.

As examples of the protective sheet, a paper such as glassine paper, coated paper, and cast paper; a polyester film such as a polyethylene terephthalate film, polybuthylene terephthalate film, and polyethylene naphthalate film; a polyolefin film such as a polypropylene film and polyethylene film; and the like can be given. A parting agent such as a silicone resin may be applied to the surface of the protective sheet.

Commonly known methods can be used for applying the adhesive of the present invention on the surface of the protective sheet substrate without any specific limitations. As examples of the coating method, a method of using a blade coater, a roll coater, a bar coater, a die coater, a screen printer, or the like can be given.

When using the adhesive sheet of the present invention, the adhesive sheet is laminated to the material to be bonded and heated at a specified temperature (100 to 200° C.) under pressure, if necessary, when the adhesive is heat curable, or irradiated with UV rays (at a dose of 100 to 1,000 mJ/cm$^2$) when the adhesive is photo curable, thereby curing the adhesive agent and bonding the materials.

According to the present invention, a circuit-forming technique, in which adhesiveness is not impaired even if an insulating substrate with a smooth surface is used, is provided.

EXAMPLES

The present invention is described below in more detail by way of examples.

The present invention, however, is not limited in any way to the following examples.

Synthesis Example 1

3-Glycidoxypropyltrimethoxysilane (20 g, 85 mmol) was dissolved in toluene (20 g), and water (10 g) and methanesulfonic acid (0.82 g) were added to the solution. The mixture was stirred at room temperature for 24 hours. An organic layer was separated and collected from the reaction mixture. Toluene was removed from the organic layer by distillation under reduced pressure to obtain 15 g of a transparent, colorless, and viscous liquid. The product is referred to as polysilsesquioxane A.

The number average molecular weight (Mn) and characteristic absorption of IR of the polysilsesquioxane A are shown in Table 1.

Synthesis Example 2

13 g of a transparent, colorless, and viscous liquid was obtained in the same manner as in Synthesis Example 1, except for using 3-glycidoxypropyltrimethoxysilane (10 g, 42 mmol) and phenyltrimethoxysilane (8.4 g, 42 mmol) instead of 3-glycidoxypropyltrimethoxysilane (20 g, 85 mmol). The product is referred to as polysilsesquioxane B.

The number average molecular weight (Mn) and characteristic absorption of IR of the polysilsesquioxane B are shown in Table 1.

Synthesis Example 3

13 g of a transparent, colorless, and viscous liquid was obtained in the same manner as in Synthesis Example 1, except for using 3-glycidoxypropyltrimethoxysilane (10 g, 42 mmol) and 2-cyanoethyltrimethoxysilane (7.4 g, 42 mmol) instead of 3-glycidoxypropyltrimethoxysilane (20 g, 85 mmol). The product is referred to as polysilsesquioxane C.

The number average molecular weight (Mn) and characteristic absorption of IR of the polysilsesquioxane C are shown in Table 1.

Synthesis Example 4

15 g of a transparent, colorless, and viscous liquid was obtained in the same manner as in Synthesis Example 1, except for using 3-glycidoxypropyltrimethoxysilane (10 g, 42 mmol) and acetoacetoxypropyltrimethoxysilane (10.4 g, 42 mmol) instead of 3-glycidoxypropyltrimethoxysilane (20 g, 85 mmol). The product is referred to as polysilsesquioxane D.

The number average molecular weight (Mn) and characteristic absorption of IR of the polysilsesquioxane D are shown in Table 1.

Synthesis Example 5

15 g of a transparent, colorless, and viscous liquid was obtained in the same manner as in Synthesis Example 1, except for using 3-mercaptopropyltrimethoxysilane (20 g, 102 mmol) instead of 3-glycidoxypropyltrimethoxysilane (20 g, 85 mmol). The product is referred to as polysilsesquioxane E.

The number average molecular weight (Mn) and characteristic absorption of IR of the polysilsesquioxane E are shown in Table 1.

Synthesis Example 6

14 g of a transparent, colorless, and viscous liquid was obtained in the same manner as in Synthesis Example 1, except for using 3-glycidoxypropyltrimethoxysilane (10 g, 42 mmol) and N,N-dimethylaminopropyltrimethoxysilane (8.7 g, 42 mmol) instead of 3-glycidoxypropyltrimethoxysilane (20 g, 85 mmol). The product is referred to as polysilsesquioxane F.

The number average molecular weight (Mn) and characteristic absorption of IR of the polysilsesquioxane F are shown in Table 1.

Synthesis Example 7

13 g of a transparent, colorless, and viscous liquid was obtained in the same manner as in Synthesis Example 1, except for using methacryloxypropyltrimethoxysilane (10 g, 42 mmol) and 2-cyanoethyltrimethoxysilane (7.0 g, 40 mmol) instead of 3-glycidoxypropyltrimethoxysilane (20 g, 85 mmol). The product is referred to as polysilsesquioxane G.

The number average molecular weight (Mn) and characteristic absorption of IR of the polysilsesquioxane G are shown in Table 1.

Synthesis Example 8

15 g of a transparent, colorless, and viscous liquid was obtained in the same manner as in Synthesis Example 1, except for using methacryloxypropyltrimethoxysilane (10 g, 40 mmol) and acetoacetoxytrimethoxysilane (9.9 g, 40 mmol) instead of 3-glycidoxypropyltrimethoxysilane (20 g, 85 mmol). The product is referred to as polysilsesquioxane H.

The number average molecular weight (Mn) and characteristic absorption of IR of the polysilsesquioxane H are shown in Table 1.

TABLE 1

| Polysilsesquioxane | Mn | IR (cm$^{-1}$) |
| --- | --- | --- |
| A | 2,200 | 3,070, 3,050, 2,940, 2,870, 1,130 |
| B | 2,000 | 3,070, 3,050, 2,940, 2,870, 1,590, 1,130, 740 |
| C | 1,700 | 3,070, 3,050, 2,940, 2,870, 2,100, 1,130 |
| D | 1,800 | 3,070, 3,050, 2,940, 2,870, 1,720, 1,130 |
| E | 1,700 | 3,070, 3,050, 2,940, 2,870, 2,600 |
| F | 1,900 | 3,070, 3,050, 2,940, 2,870, 1,130 |
| G | 2,000 | 3,070, 3,050, 2,940, 2,870, 2,100, 1,740, 1,600, 1,130 |
| H | 2,100 | 3,070, 3,050, 2,940, 2,870, 1,740, 1,720, 1,600, 1,130 |

Example 1

The polysilsesquioxane A (10 g) obtained in Synthesis Example 1 was dissolved in toluene (20 g), and 2-ethyl-4-methylimidazole (0.2 g) was added as a catalyst. The mixture was stirred at room temperature for three minutes to obtain an adhesive A.

The adhesive A was applied to the surface of a polyimide film with a thickness of 50 μm ("Kapton" manufactured by Du Pont-Toray Co., Ltd.) to make the thickness of the coating after drying 20 μm. The coating was dried at 100° C. for one minute to remove the solvent.

Next, a protective sheet ("PET3811" manufactured by LINTEC Corp.), which is a polyethyleneterephthalate film with a thickness of 38 μm treated with silicone for ease of parting, was attached to obtain a test specimen A1.

Example 2

An adhesive B and a test specimen B1 were prepared in the same manner as in Example 1, except for using the polysilsesquioxane B (10 g) instead of the polysilsesquioxane A (10 g).

Example 3

An adhesive C and a test specimen C1 were prepared in the same manner as in Example 1, except for using the polysilsesquioxane C (10 g) instead of the polysilsesquioxane A (10 g).

Example 4

An adhesive D and a test specimen D1 were prepared in the same manner as in Example 1, except for using the polysilsesquioxane D (10 g) instead of the polysilsesquioxane A (10 g).

Example 5

An adhesive E and a test specimen E1 were prepared in the same manner as in Example 1, except for using 5 g of polysilsesquioxane A and the polysilsesquioxane E (5 g) instead of 10 g of polysilsesquioxane A and not adding 2-ethyl-4-methylimidazole (0.2 g) as a catalyst.

Example 6

An adhesive F and a test specimen F1 were prepared in the same manner as in Example 1, except for using the polysilsesquioxane B (5 g) and the polysilsesquioxane E (5 g) instead of 10 g of polysilsesquioxane A and not adding 2-ethyl-4-methylimidazole (0.2 g) as a catalyst.

Example 7

An adhesive G and a test specimen G1 were prepared in the same manner as in Example 1, except for using the polysilsesquioxane F (10 g) instead of the polysilsesquioxane A (10 g) and not adding 2-ethyl-4-methylimidazole (0.2 g) as a catalyst.

Example 8

The polysilsesquioxane G (10 g) obtained in Synthesis Example 7 was dissolved in toluene (20 g), and a photoinitiator ("IRGACURE 651" manufactured by Chiba Specialty Chemicals Co., Ltd.) (0.2 g) was added. The mixture was stirred at room temperature for one hour to obtain an adhesive H.

The adhesive H was applied to the surface of a polyethylenenaphthalate film with a thickness of 50 μm ("Teonex" manufactured by Teijin DuPont Films) to make the thickness of the coating after drying 20 μm. The coating was dried at 100° C. for one minute to remove the solvent.

Next, a protective sheet ("PET3811" manufactured by LINTEC Corp.), which is a polyethyleneterephthalate film with a thickness of 38 μm treated with silicone for ease of parting, was attached and irradiated with UV rays (500 mJ/cm$^2$) to obtain a test specimen H1.

Example 9

An adhesive I and a test specimen I1 were prepared in the same manner as in Example 8, except for using the polysilsesquioxane H (10 g) instead of the polysilsesquioxane G (10 g).

(Evaluation of Adhesive Strength)

A test for evaluating the adhesive strength of the test specimens A1 to I1 obtained in Examples 1 to 9 was carried out according to JIS Z0237.

Each of the test specimens A1 to I1 was cut to a width of 20 mm. After parting the protective sheet, the test specimens were attached to a test plate under pressure of a rubber roller at a load of 2 kg. The adhesives were cured by heating at 160° C. for 30 minutes in the case of the test specimens A1 to G1, or by irradiating with UV rays (1,000 mJ/cm²) in the case of the test specimens H1 and I1. The test specimens were then torn off from the test plate to the 180° angle direction from the end to measure the adhesive strength.

The results are shown in Table 2.

In Table 2, the test plate 1 is a 304SS steel plate, the test plate 2 is a glass plate, the test plate 3 is glass epoxy resin film, the test plate 4 is polyethyleneterephthalate film, and the test plate 5 is a copper film.

(Cross-Cut Adhesion Test)

A cross-cut adhesion test of the test specimens A1 to I1 obtained in Examples 1 to 9 was carried out according to JIS K-5400.

The test specimens A1 to G1 were heated at 160° C. for 30 minutes after removing the protective sheet, and the test specimens H1 and I1 were cured by irradiating with UV rays (1,000 mJ/cm²) after removing the protective sheet to obtain test specimens A2 to I2. The degree of adhesion of each adhesive layer was inspected by the naked eye according to JIS K-5400.

As a result of inspection by the naked eye, the case in which adhesive layer removal was not observed was evaluated as "Good", and the case in which adhesive layer removal was observed was evaluated as "Bad".

The evaluation results are shown in Table 2.

In Table 2, "BC" indicates that the substrate was damaged when the peel-off test was conducted due to strong and firm bonding.

TABLE 2

| | | | Adhesion strength (N/20 mm) | | | | | Cross-cut adhesion test | |
| | | | Test plate | | | | | | |
| Example | Adhesive | Test specimen | 1 | 2 | 3 | 4 | 5 | Test specimen | Evaluation |
| --- | --- | --- | --- | --- | --- | --- | --- | --- | --- |
| 1 | A | A1 | 8.5 | 11.5 (BC) | 9.0 | 4.0 | 7.0 | A2 | Good |
| 2 | B | B1 | 6.5 | 12.0 | 9.5 | 4.0 | 7.5 | B2 | Good |
| 3 | C | C1 | 7.0 (BC) | 10.5 (BC) | 9.0 | 3.5 | 6.0 (BC) | C2 | Good |
| 4 | D | D1 | 7.5 (BC) | 11.0 | 8.5 (BC) | 4.5 | 6.5 | D2 | Good |
| 5 | E | E1 | 7.0 | 10.0 | 8.0 (BC) | 4.5 | 6.5 (BC) | E2 | Good |
| 6 | F | F1 | 8.0 | 12.0 (BC) | 10.0 | 4.0 | 7.0 | F2 | Good |
| 7 | G | G1 | 8.5 | 13.0 | 9.5 | 4.0 | 7.5 (BC) | G2 | Good |
| 8 | H | H1 | 7.0 | 11.0 (BC) | 9.0 | 5.0 | 7.5 | H2 | Good |
| 9 | I | I1 | 6.5 | 12.0 | 9.0 | 4.5 | 7.0 | I2 | Good |

As is clear from Table 2, the test specimens A1 to I1 (adhesive sheet of the present invention) obtained in Examples 1 to 9 by using the adhesive of the present invention exhibited excellent adhesion strength to various materials.

What is claimed is:

1. An adhesive comprising a ladder-type polysilsesquioxane having a number average molecular weight of 1,700 to 30,000, and having a recurring unit of the following formula (I) in the molecule,

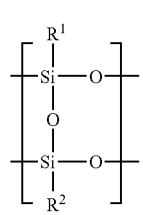

wherein $R^1$ represents a group that includes an epoxy group or a glycidyloxy group, and $R^2$ represents the same group as $R^1$, an alkyl group having 1 to 6 carbon atoms which may have a substituent, an alkoxy group having 1 to 6 carbon atoms which may have a substituent, or a phenyl group which may have a substituent, and the sum of the number of $R^1$ and the number of $R^2$ that includes an epoxy group or a glycidyloxy group is 50% or more of the sum of the number of $R^1$ and the number of $R^2$, and at least one heat-curing agent selected from the group consisting of an imidazole, a pyrazole, a triazole and a triazine.

2. The adhesive according to claim 1, wherein $R^2$ is an alkyl group having 1 to 6 carbon atoms, an alkoxy group having 1 to 6 carbon atoms, or a phenyl group which may have at least one substituent selected from the group consisting of an epoxy group, a glycidyloxy group, a cyano group, a mercapto group, an oxo group, an acetoacetoxy group, and an amino group which may have a substituent.

3. The adhesive according to claim 1, wherein $R^1$ is a group in which an epoxy group or a glycidyloxy group is bonded to an alkylene group having 1 to 6 carbon atoms which may have a substituent or a phenylene group which may have a substituent.

4. The adhesive according to claim 1, wherein a material to be bonded by the adhesive is at least one material selected from the group consisting of glass, ceramics, a metal, and a synthetic resin.

5. The adhesive according to claim 4, wherein the metal is copper, aluminum, gold, platinum, or an alloy of these metals.

6. An adhesive sheet having an adhesive layer formed by using the adhesive according to claim 1 on at least one side of a substrate.

7. An adhesive method characterized in that the adhesive sheet according to claim 6 is laminated to a material to be bonded and heated at 100° C. to 200° C. under pressure, thereby curing the adhesive agent and bonding the materials.

* * * * *